United States Patent [19]
Ueda et al.

[11] Patent Number: 5,313,540
[45] Date of Patent: May 17, 1994

[54] OPTICAL FIBER TERMINAL SUITABLE FOR AUTOMATIC ASSEMBLY

[75] Inventors: Tetsuji Ueda; Kazuhiko Kurata; Koji Yamamoto, all of Tokyo, Japan

[73] Assignee: NEC Corporation, Tokyo, Japan

[21] Appl. No.: 1,545

[22] Filed: Jan. 6, 1993

[30] Foreign Application Priority Data

Jan. 10, 1992 [JP] Japan .................................. 4-002989

[51] Int. Cl.[5] .............................................. G02B 6/36
[52] U.S. Cl. ......................................... 385/78; 385/76
[58] Field of Search ......................... 385/53, 55, 76-85

[56] References Cited
U.S. PATENT DOCUMENTS

| 3,984,174 | 10/1976 | Landgreen | 385/77 X |
|---|---|---|---|
| 4,193,664 | 3/1980 | Ellwood | 385/78 X |
| 4,274,708 | 6/1981 | Cocito et al. | 385/55 X |
| 4,478,485 | 10/1984 | Khoe et al. | 385/53 |
| 4,615,581 | 10/1986 | Morimoto | 350/96.21 |
| 4,818,061 | 4/1989 | Iwano et al. | 385/84 X |
| 5,104,242 | 4/1992 | Ishikawa | 385/53 |

Primary Examiner—John D. Lee
Attorney, Agent, or Firm—Leydig, Voit & Mayer

[57] ABSTRACT

An optical fiber terminal capable of automatic assembly is disclosed. The terminal includes a ferrule of substantially cylindrical shape provided with a bore directed generally longitudinally to guide an optical fiber and with at least one projection on the outer periphery of the ferrule, a housing for receiving the ferrule made up of sections of a longitudinally cut tubular member with the inner periphery having a configuration which permits the ferrule to be held longitudinally slidably and a stopper to define the most forward position of the projection of the ferrule, and at least one resilient member which resiliently forces the projection of the ferrule forward with respect to the housing.

11 Claims, 5 Drawing Sheets

OPTICAL FIBER TERMINAL SUITABLE FOR AUTOMATIC ASSEMBLY

BACKGROUND OF THE INVENTION

Field of the Invention

The present invention generally relates to an optical fiber connector and more specifically to an optical fiber terminal for an optical fiber connector.

Description of the Related Art

Various types of optical fiber connectors have been proposed in order to promote transmission quality. One such optical fiber connector is known from U.S. Pat. No. 4,615,581 granted to the present applicant (the inventor, Y. Morimoto). The Morimoto connector has a guide hole for guiding the stripped end of an optical fiber cable with its center axis slanted with respect to the center axis of the optical fiber connector. By virtue of this structure a light reflected on the end surfaces of the connected optical fibers is deviated from the optical feedback path to the laser source, whereby stable transmission is ensured against an oscillatory behavior of the laser source.

FIG. 1 is a cross sectional view of an optical fiber terminal substantially similar to that used in the Morimoto connector, and FIG. 2 is a cross sectional view of an optical fiber connector with an adapter connecting the two terminals as shown in FIG. 1. Since an optical fiber terminal structure is our present concern, an optical fiber extending parallel to the center axis of the terminal is shown in FIGS. 1 and 2 in lieu of the slanted optical fiber described above.

The optical fiber terminal is made up of ferrule 3, tensile member 7, coil spring 9, spring housing member 9' and housing 2. Housing 2 has an annular or rectangular transversal cross section. Hereafter, the direction of the optical fiber terminal facing the other optical fiber terminal to be connected will be referred to as "forward" and the reverse direction as "backward" of the terminal. Ferrule 3 has a guide bore made up of two parts of different diameters along the central axis, the first part serving to guide an optical fiber and the second part serving to hold the jacketed optical fiber consisting of the protective jacket of the optical fiber made up of a nylon cladding and reinforcing tensile filaments. Spring housing member 9' defines a chamber for receiving coil spring 9 together with the inner periphery of housing 2 and the rear surface of ferrule flange 3'. Coil spring 9 is directed to providing good contact pressure between the front surfaces of the ferrules in the optical fiber terminals to be connected by forcing ferrule flange 3' forward, thus ensuring stable coupling between the two optical fibers to be coupled. The jacketed optical fiber extending backwards out of ferrule 3 is covered with tensile member 7 for caulking. Housing 2 receives ferrule 3, coil spring 9, spring housing member 9', and tensile member 7 to constitute an optical fiber terminal. Housing 2 has stopper projection 11 on its inner periphery to limit the most forward position of ferrule flange 3' so that, when ferrule flange 3' is brought into contact with stopper projection 11, the front surface of ferrule 3 is disposed a little forward of that of housing 2. Housing 2 also has annular groove 12 on its inner periphery for the flange of spring housing member 9' to be engaged with housing 2, which further has an annular groove 13 on its outer periphery to engage with adapter 10. Adapter 10 has both projection 14 to engage with annular groove 13 and split sleeve 15 to snap-fit to the inner periphery of housing 2, thereby connecting two optical fiber terminals.

When the optical fiber terminal is assembled, coil spring 9, spring housing member 9' and tensile member 7 are mounted on ferrule 3. Optical fiber 4 and jacketed optical fiber 5 are then inserted into the bore of ferrule 3 and are individually secured to ferrule 3 by adhesion. Then, optical fiber outer sheath 6 and tensile member 7 are secured to the outer periphery of ferrule 3 by caulking. Ferrule 3 with the inner bore fixedly holding the optical fiber and the outer periphery mounting coil spring 9, spring housing member 9' and tensile member 7, is then inserted into housing 2 until ferrule flange 3' abuts against stopper projection 11 and the flange of spring housing member 9' engages with annular groove 12. Two optical fiber terminals thus assembled are coupled by adapter 10, projections 14 provided on the inner periphery of adapter 10 (in FIG. 2 only the right half of adapter 10 is depicted) being engaged with annular grooves 13 and split sleeves 15 being inserted into housings 2 at the same time. As described above, while the front surface of ferrule 3 is not flush with that of housing 2 (biased forward) before the two terminals are connected, it is flush after connection through compression of coil spring 9 which provides a predetermined appropriate pressure between the front surfaces of the two connected ferrules.

In the prior art optical fiber terminal as described above, a coil spring is employed in order to provide a forward bias to the ferrule. However, a problem has been that, since coil springs are liable to entangle with each other, it is difficult to pick them up individually by machine in automatic processes, which causes automatic supply of the coil springs and thus automatic assembly of optical fiber terminals to be difficult.

Another problem arises from the tubular shape of the housing. In order to assemble the constituent parts such as the ferrule etc. in an optical fiber terminal, it is necessary to insert from one end of the tubular housing the parts which are designed so that their positions and directions accord with the inner periphery configuration of the housing. In this terminal structure, it is no easy task to reliably assemble the terminal by means of simple operation of an assembly machine. Thus, it is difficult to assemble optical fiber terminals by automatic processes.

SUMMARY OF THE INVENTION

It is an object of the present invention to provide an optical fiber terminal capable of automatic assembly by the simple operation of an assembly machine.

It is another object of the present invention to provide an optical fiber terminal capable of being automatically assembled without handling a coil spring.

In order to attain the first object above, the optical fiber terminal for an optical fiber connector includes a ferrule having a substantially cylindrical shape, a bore directed generally longitudinally to guide at least an optical fiber, and a projection on the outer periphery. A housing is provided for receiving the ferrule. The housing includes a longitudinally cut tubular member, an inner periphery which permits the ferrule to be longitudinally slidable, and a stopper for defining the forward-most position that the ferrule can slide. A resilient member is provided which forces the ferrule forward with respect to the housing. The resilient member includes a tongue-shaped portion having one end secured to the inner periphery of the housing and the other end abutted against a backward surface of the projection of the ferrule.

In order to attain the second object, the resilient means included in the optical fiber terminal above described is tongue-shaped resilient means with one end secured to said inner periphery of the housing means and the other end abutted against the backward surface of the projection of the ferrule means.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
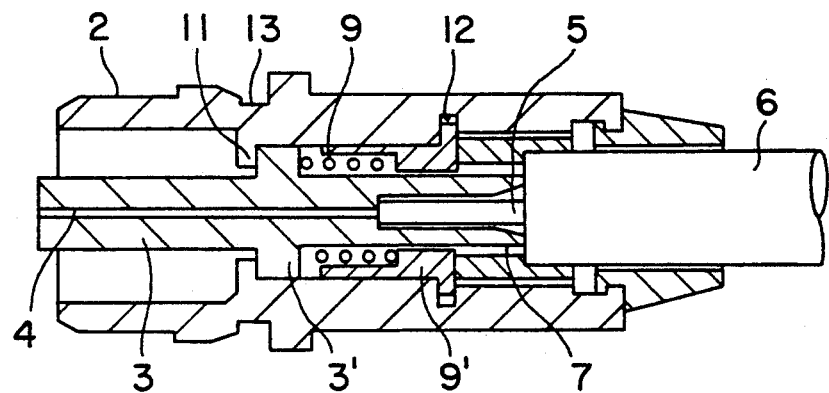
FIG. 1 is a cross sectional view of an optical fiber terminal of the prior art.
Figure 2:
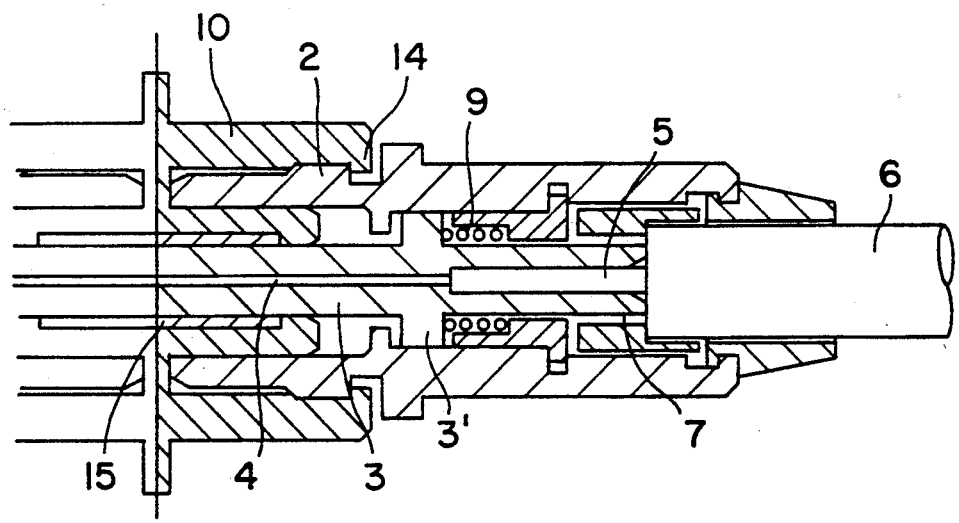
FIG. 2 is a cross sectional view of an optical fiber connector of the prior art.
Figure 3:
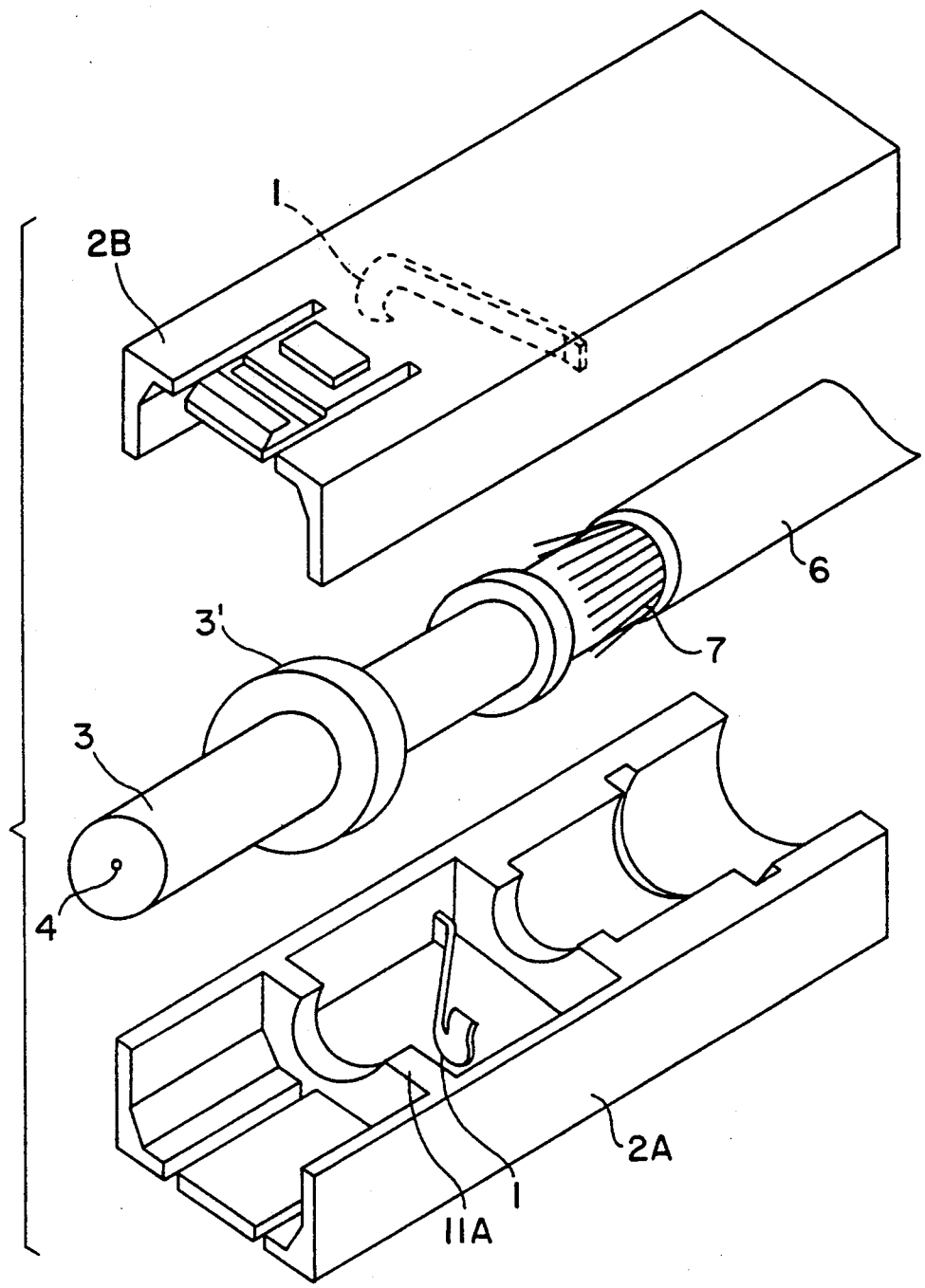
FIG. 3 is an exploded perspective view of a first embodiment of the present invention.
Figure 4:
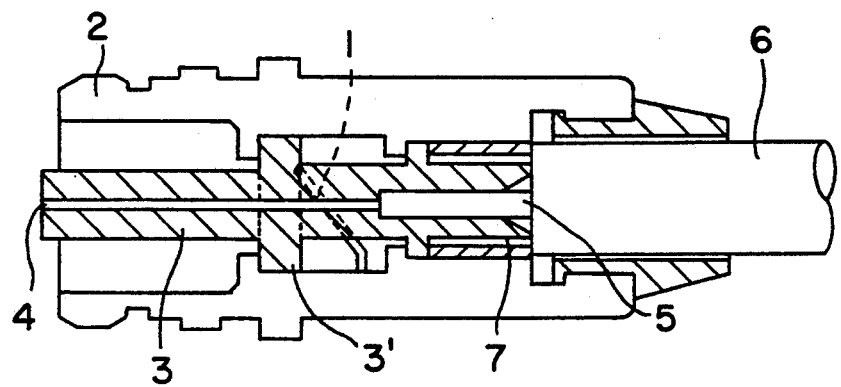
FIG. 4 is a cross sectional view of the terminal shown in FIG. 3.

With reference to the drawings, the preferred embodiments of the present invention will be described below. FIG. 3 is an exploded perspective view of a first embodiment of the present invention separately showing constituent elements before assembly. FIG. 4 is a cross sectional view of the optical fiber terminal shown in FIG. 3 after being assembled. The optical fiber terminal differs from that illustrated in FIGS. 1 and 2 in that it includes resilient tongue members 1 in place of coil spring 9 and a housing made up of a pair of housing members 2A, 2B made by cutting a rectangular tubular member along the center axis. Accordingly, the components except for resilient members 1 and housing members 2A, 2B will have the same reference numbers and not be further explained.

The pair of housing members 2A, 2B are symmetrical with respect to the plane including the center axis of ferrule 3, having a structure capable of clamping the ferrule and optical-fiber combination transversally and holding the combination longitudinally slidably.

One end of each of two resilient tongue members 1 is secured in advance to the inner wall of each of housing members 2A, 2B so that the other end of each resilient tongue member 1 abuts against the rear surface of ferrule flange 3'. In the present embodiment resilient tongue members 1 are formed integrally with housing members 2A and 2B, and thus can be manufactured readily by injection-molding plastic or by diecasting zinc or a similar metal. Stopper 11A corresponds to stopper 11 in FIGS. 1 and 2 and plays the same role as stopper 11.

Figure 5:
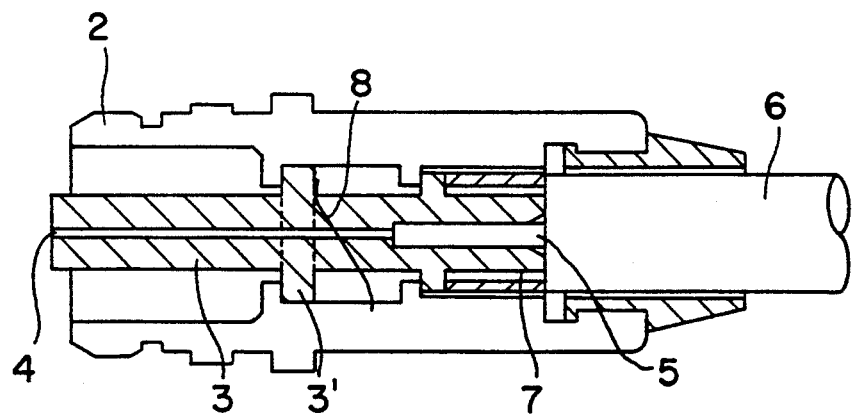
FIG. 5 is a cross sectional view of a second embodiment of the optical fiber terminal according to the present invention.

FIG. 5 is a cross sectional view of a second embodiment of the optical fiber terminal showing the structure after being assembled. In this embodiment leaf spring 8 is used in place of resilient tongue member 1. Individual ends of leaf springs 8 are incorporated in and secured to the inner walls of housing members 2A and 2B in advance so that the other ends abut against the rear surface of ferrule flange 3' before assembling the connector. As materials for leaf springs 8, spring steel, stainless steel bands, copper alloys and similar materials are recommendable.

Figure 6:
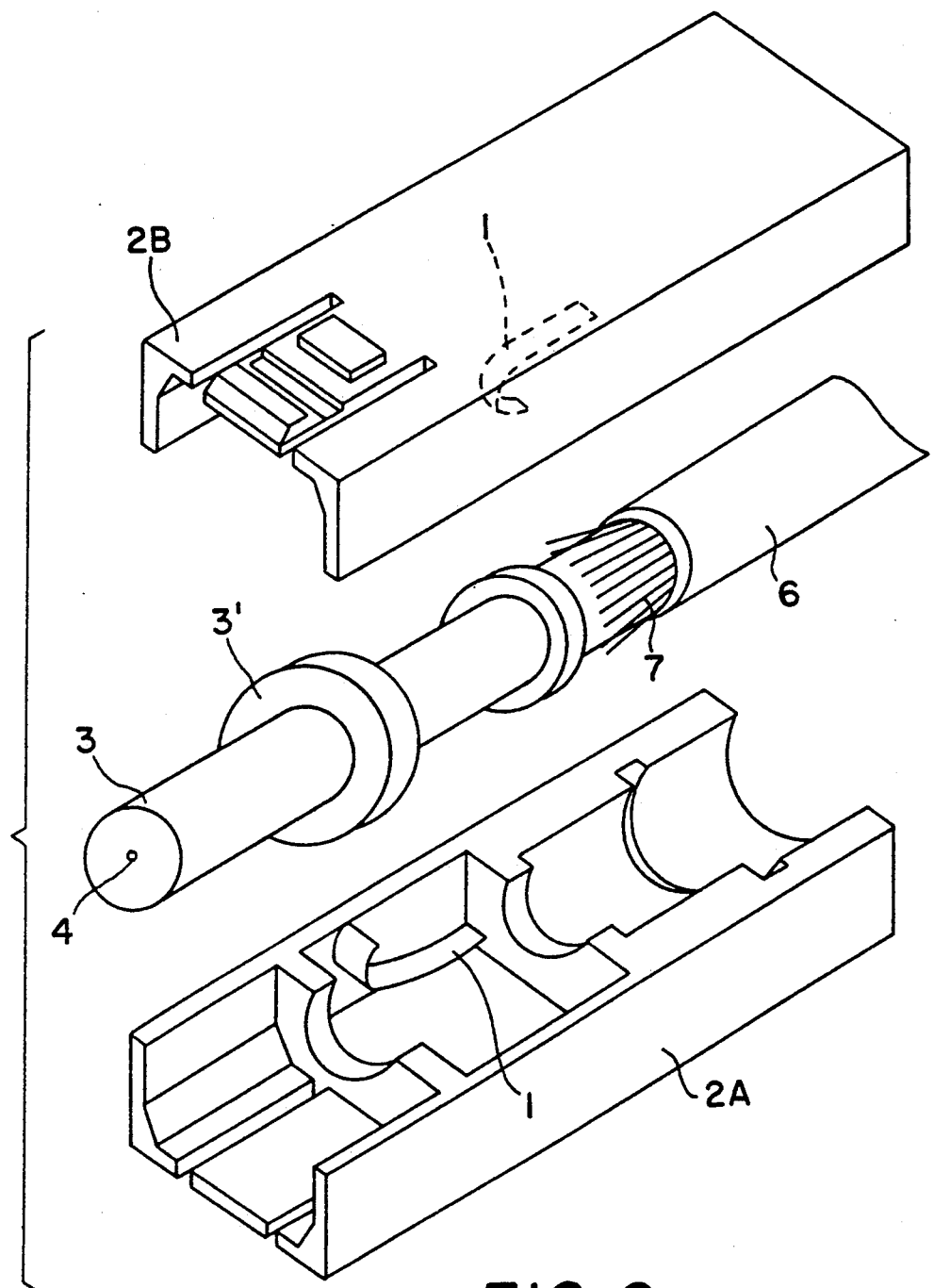
FIG. 6 is an exploded perspective view of a third embodiment of the optical fiber terminal according to the present invention.

FIG. 6 is an exploded perspective view of a third embodiment of the optical fiber terminal before being assembled. In the terminal shown in FIG. 4, resilient tongue members 1 are secured to housing members 2A and 2B one to each housing member at positions such that they are disposed symmetrically with respect to the center axis of ferrule 3 when assembled.

Figure 7:
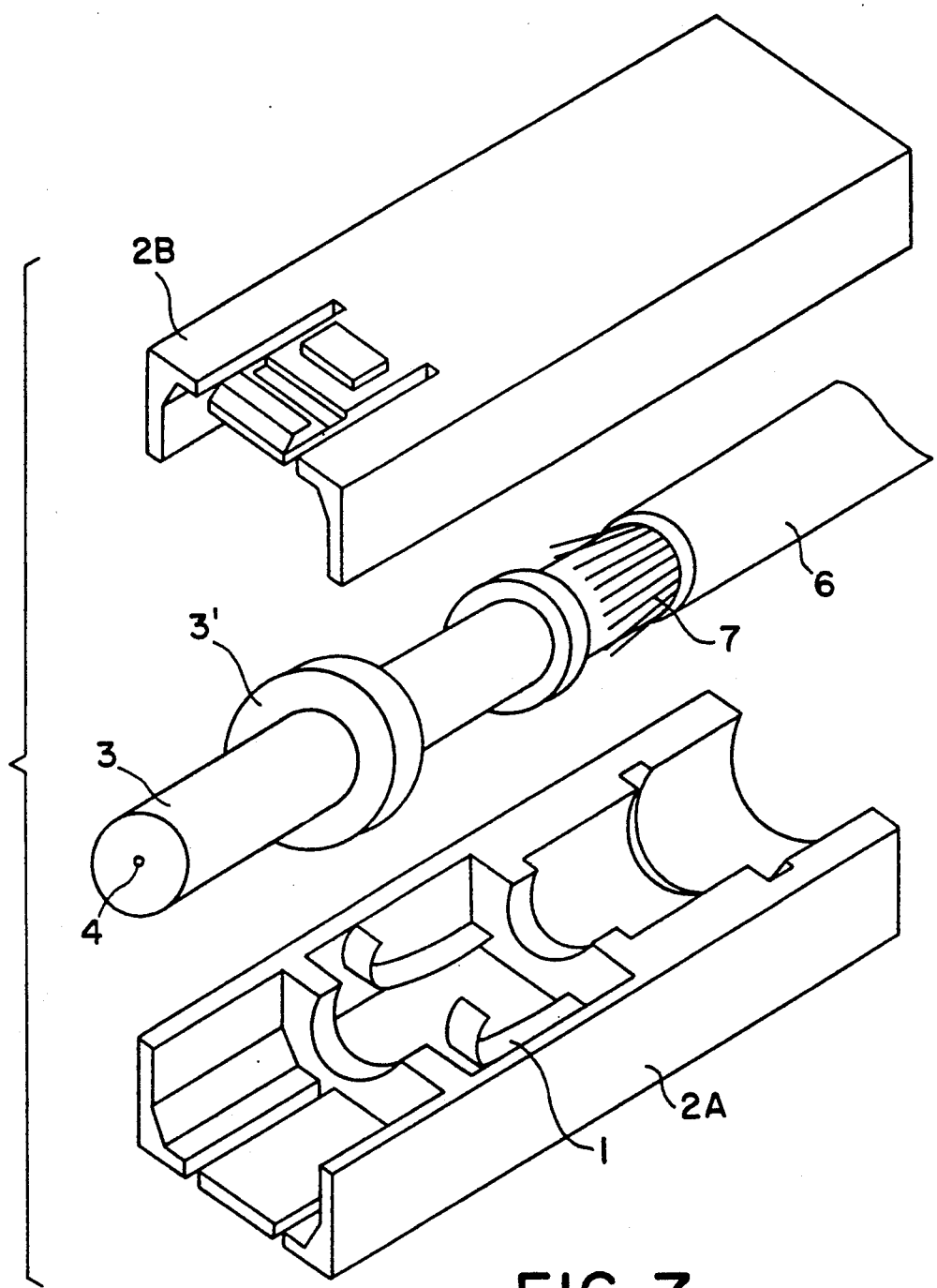
FIG. 7 is an exploded perspective view of a fourth embodiment of the optical fiber terminal according to the present invention.

FIG. 7 is an exploded perspective view showing a fourth embodiment of an optical fiber terminal according to the present invention. In the terminal shown in FIG. 7, two resilient tongue members 1 are parallel secured to either of housing members 2A and 2B.

As described above, since a resilient tongue member integrated with a housing member is employed in the present invention in place of a coil spring which is liable to entangle with other coil springs, the optical fiber terminal of the present invention provides an advantage in that assembly can be completely automated.

Further, since the housing has a structure such that it is divided into two parts which can be assembled after parts have been loaded within them, the optical connector terminal provides an advantage in that positioning and fixing of parts by machine are facilitated, thereby allowing assembly of the optical fiber terminal to be completely automated.

It is to be understood, however, that although the characteristics and advantages of the present invention have been set forth in the foregoing description, the disclosure is illustrative only, and changes may be made in the shape and arrangement of the parts within the scope of the appended claims.

What is claimed is:

1. An optical fiber terminal for an optical fiber connector, including
    ferrule means having a substantially cylindrical shape provided with a bore directed generally longitudinally to guide at least an optical fiber and also provided with at least one projection on the outer periphery thereof,
    housing means for receiving said ferrule means made up of sections of a longitudinally cut tubular member, the inner periphery of said housing means having a configuration which permits said ferrule means to be held longitudinally slidably, and stopper means to define the most forward position of said projection of said ferrule means, and
    resilient means which resiliently forces said projection of said ferrule means forward with respect to said housing means, wherein forward refers to the direction of said optical fiber terminal facing another optical fiber terminal to be connected, wherein said resilient means is tongue-shaped resilient means with one end secured to said inner periphery of said housing means and the other end abutted against the backward surface of said projection of said ferrule means.

2. An optical fiber terminal according to claim 1, wherein said housing means is made up of two sections made by cutting a tubular member longitudinally along the center axis 3. An optical fiber terminal according to claim 1, wherein said tongue-shaped resilient means is formed integrally with said housing means.

4. An optical fiber terminal according to claim 1, wherein said tongue-shaped resilient means is at least one leaf spring fixed to said inner periphery of said housing means.

5. An optical fiber terminal according to claim 1, wherein said tongue-shaped resilient means is a pair of tongue-shaped resilient members, one end of each of which is fixed on said inner periphery of said housing means at the positions symmetric with respect to the center axis of said ferrule means.

6. An optical fiber terminal according to claim 1 wherein said tongue-shaped resilient means includes a pair of tongue-shaped resilient members disposed parallel to each other, each of the tongue-shaped resilient members having a first end fixed to said inner periphery of any of the sections.

7. An optical fiber terminal for an optical fiber connector, the optical fiber terminal comprising:
   a housing having an inner periphery, a stopper, and a tongue-shaped resilient member having first and second ends, the first end being secured to the inner periphery;
   a ferrule having a substantially cylindrical shape, a projection disposed on an outer periphery, and a bore disposed generally longitudinally for guiding an optical fiber, the ferrule being longitudinally slidably disposed within the inner periphery of the housing, the second end of the tongue-shaped resilient member abutting the projection, the ferrule being longitudinally slidable between: p2 a first position wherein the projection abuts the stopper while the tongue-shaped resilient member urges the ferrule toward a portion of the optical fiber terminal to be connected with another optical fiber terminal, and
   a second position wherein the projection is longitudinally spaced from the stopper while the tongue-shaped resilient member urges the ferrule toward the stopper.

8. The optical fiber terminal according to claim 7 wherein the housing includes first and second sections divided longitudinally along a center axis whereby the automatic assembly of the optical fiber terminal by machine is facilitated.

9. The optical fiber terminal according to claim 7 wherein the housing includes a second tongue-shaped resilient member having first and second ends, the first end being secured to the inner periphery, the second end of the second tongue-shaped resilient member abutting the projection for urging the ferrule toward the portion of the optical fiber terminal to be connected with another optical fiber terminal, and the tongue-shaped resilient members being symmetrically disposed about a center axis of the ferrule.

10. The optical fiber terminal according to claim 7 wherein the tongue-shaped resilient member includes a resilient tongue member.

11. The optical fiber terminal according to claim 7 wherein the tongue-shaped resilient member includes a leaf spring.

* * * * *

UNITED STATES PATENT AND TRADEMARK OFFICE
CERTIFICATE OF CORRECTION

PATENT NO.  : 5,313,540
DATED       : May 17, 1994
INVENTOR(S) : Ueda et al.

It is certified that error appears in the above-indentified patent and that said Letters Patent is hereby corrected as shown below:

Column 6, lines 3-8, delete the text in its entirety and replace with --being longitudinally slidable between: a first position wherein the projection abuts the stopper while the tongue-shaped resilient member urges the ferrule toward a portion of the optical fiber terminal to be connected with another optical fiber terminal, and--.

Signed and Sealed this

Seventeenth Day of January, 1995

Attest:

BRUCE LEHMAN

Attesting Officer

Commissioner of Patents and Trademarks